INVENTORS.
Ralph S. Zebarth
Henry E. Frederick
BY John A. Hamilton
Attorney.

Oct. 14, 1969  R. S. ZEBARTH ET AL  3,471,893
POULTRY DEFEATHERING APPARATUS

Filed Feb. 23, 1967  5 Sheets-Sheet 2

INVENTORS.
Ralph S. Zebarth
Henry E. Frederick
BY John A. Hamilton
Attorney.

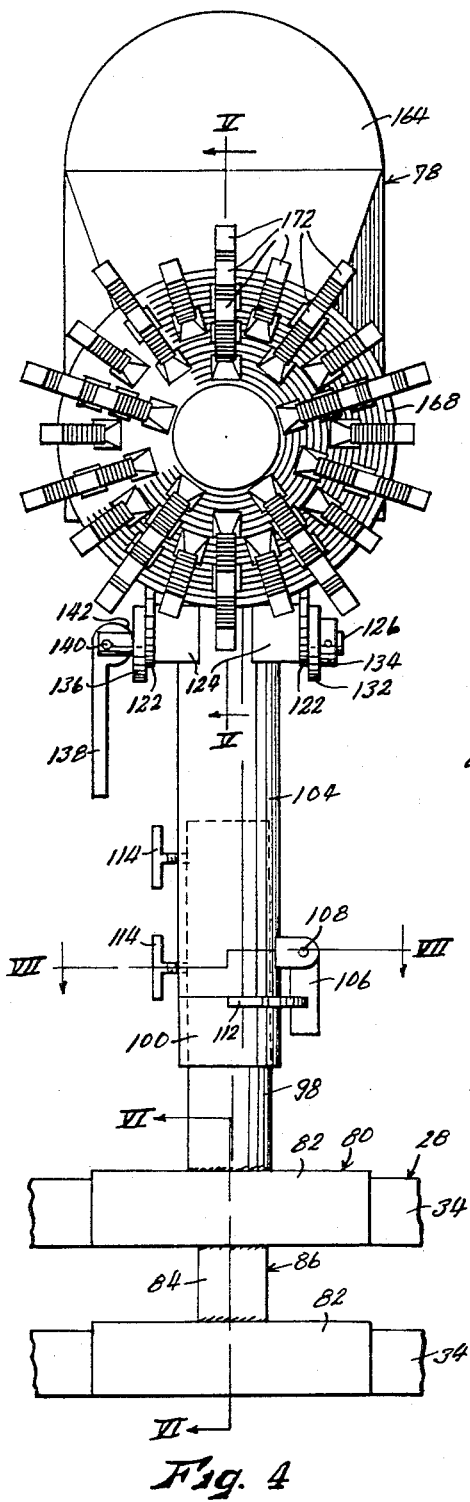
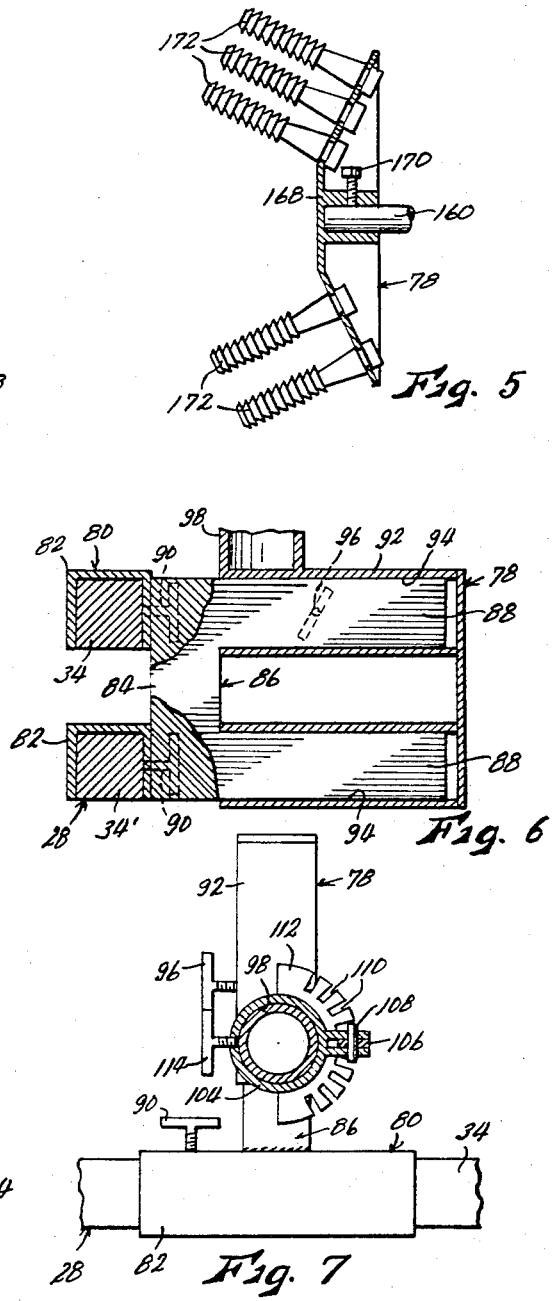

Oct. 14, 1969 R. S. ZEBARTH ET AL 3,471,893
POULTRY DEFEATHERING APPARATUS
Filed Feb. 23, 1967 5 Sheets-Sheet 4
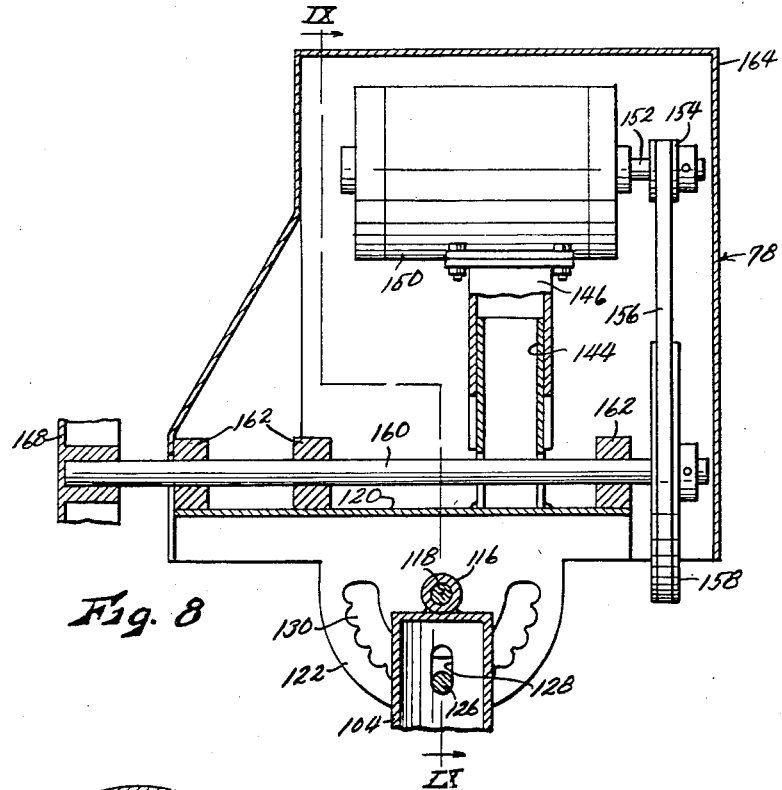
Fig. 8
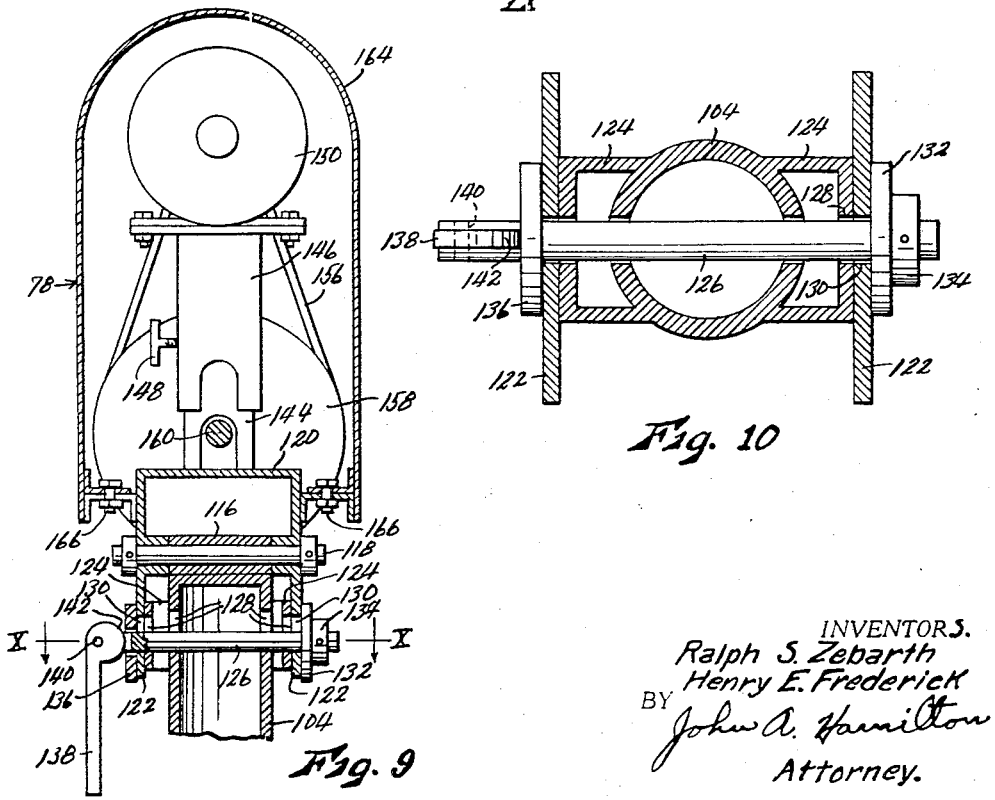
Fig. 9
Fig. 10
INVENTORS.
Ralph S. Zebarth
Henry E. Frederick
BY John A. Hamilton
Attorney.

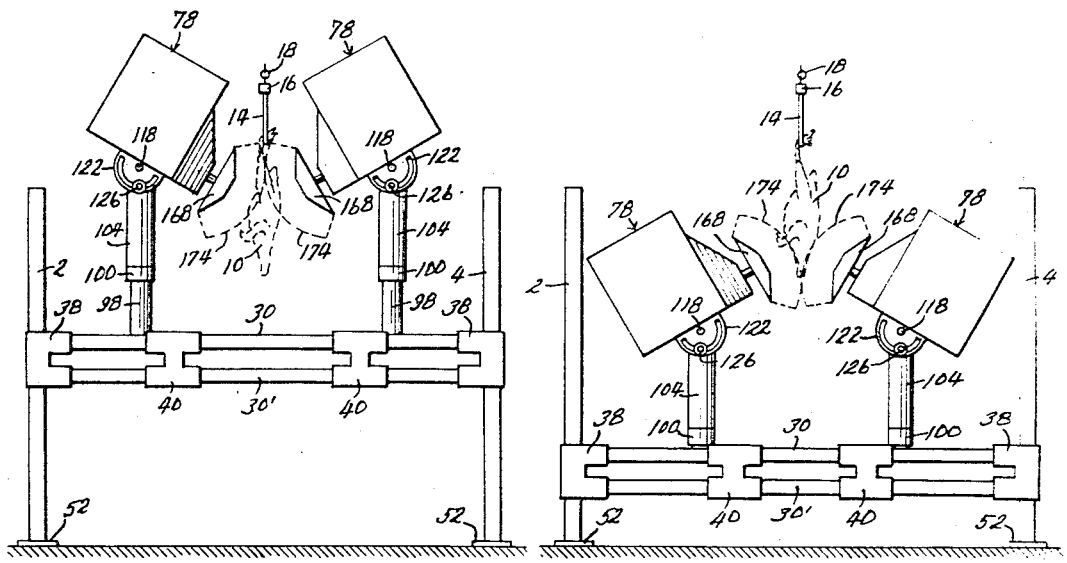
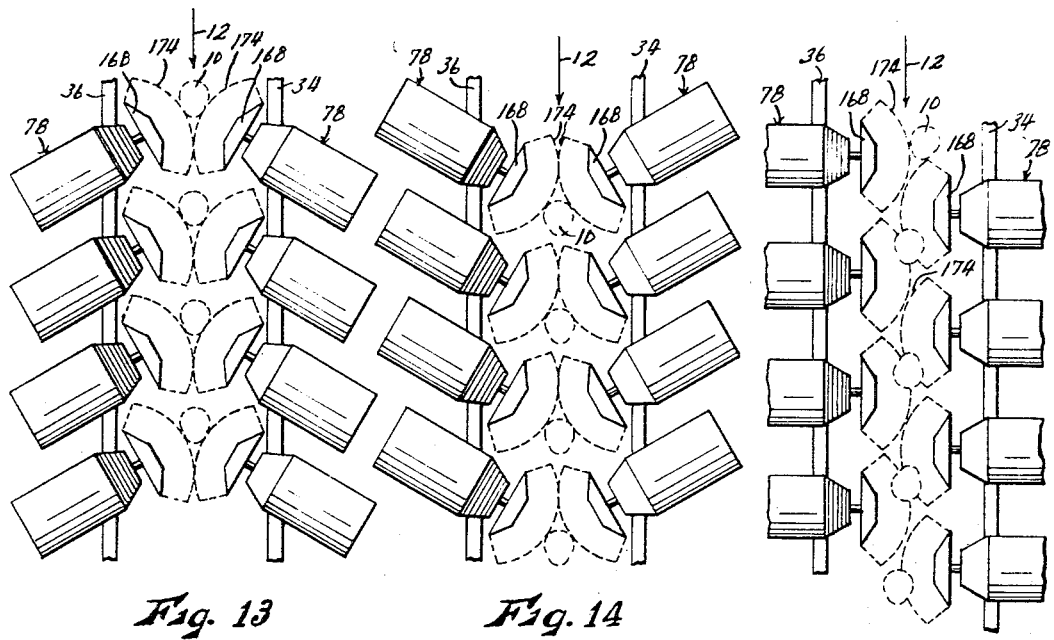

Patented Oct. 14, 1969

3,471,893
POULTRY DEFEATHERING APPARATUS
Ralph S. Zebarth and Henry E. Frederick, Kansas City, Mo., assignors, by mesne assignments, to Gordon Johnson Company, Kansas City, Mo., a corporation of Missouri
Filed Feb. 23, 1967, Ser. No. 617,925
Int. Cl. A22c 21/02
U.S. Cl. 17—11.1                                         3 Claims

ABSTRACT OF THE DISCLOSURE

A poultry defeathering apparatus has two rows of defeathering units. Each unit is self contained in that the picking head, the prime mover for rotating the head, and the support for such assembly are individually adjustable longitudinally of the machine. Further, the height of each defeathering assembly is individually variable; each assembly is separately rotatable about a vertical axis and each assembly is tiltable about a horizontal axis.

---

This invention relates to new and useful improvements in poultry defeathering apparatus, and has particular reference to an "on line" picking apparatus adapted to remove feathers from birds as they are suspended from shackles and moved at a uniform speed along a conveyor line. Still more specifically, the invention involves improvements in the general class of pickers including a series of picking heads disposed along each side of the path of poultry travel, each head being rotatable about an axis intersecting said path and having flexible picking fingers projecting toward said path, whereby to remove feathers from birds passing between said heads. Pickers of this class are commonly known as "disc pickers." Since the fingers normally project generally parallel to the axis of head rotation and are flexible, they are bent or curved outwardly from said axis by centrifugal force as the heads are rotated, so that each finger contacts the birds with a "wiping" motion transverse to the finger, which has been found to produce an effective picking action. The centrifugal bending of the fingers is of course necessary, since otherwise only the tips of the fingers would engage the birds, and no effective feather removal could occur.

The principal object of the present invention is the provision, in a poultry picker of the character described, of a picking head of novel shape, having a convex surface confronting the poultry path, and from which the fingers extend. In general, this novel shape provides a wider "mouth" for the entry of birds between opposed heads, permits the use of softer, more flexible fingers since they are already partially inclined outwardly from their rotational axes even when at rest, so as to reduce the common breakage of the fingers in use and to provide a gentler picking action, and provides for full effectiveness of even the fingers of each head closest to the rotational axis, which are subjected to only slight centrifugal force.

Another object is the provision, in a poultry picker of the character described, of a novel structure whereby the picking heads, both individually or conjointly, are rendered completely adjustable relative to the poultry path. These adjustments include movement of the heads horizontally along said path, horizontally at right angles to said path, vertically relative to the bird, and universal pivotability of the axis of rotation of each head. By this means, the individual heads of a single machine, or the heads of a series of like machines, may be effectively positioned to remove the feathers from each and every portion of a bird's skin area.

Other objects are simplicity and economy of construction, efficiency and dependability of operation, and ease and convenience of servicing and maintenace.

Figure 1:
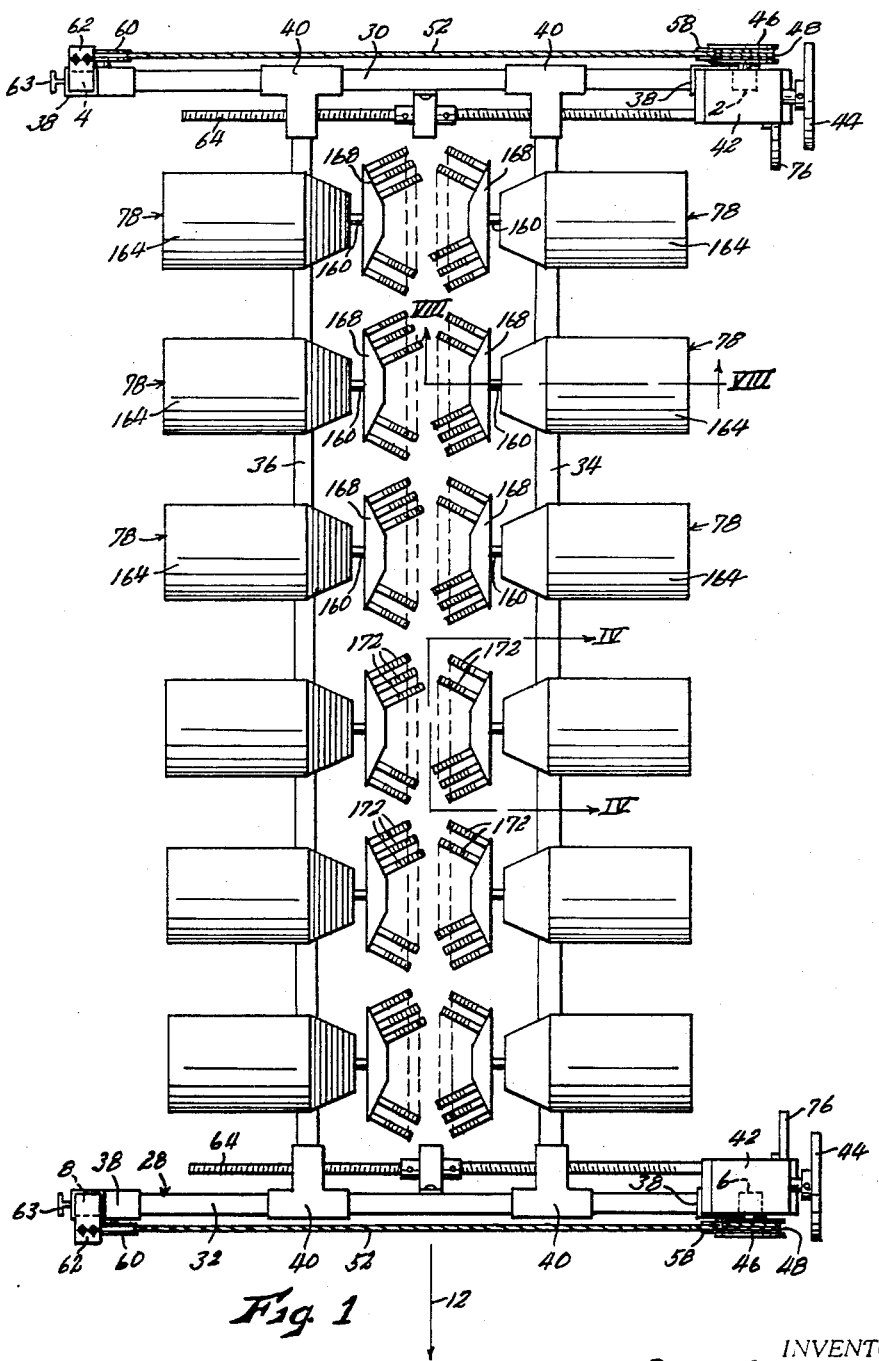
Figure 2:
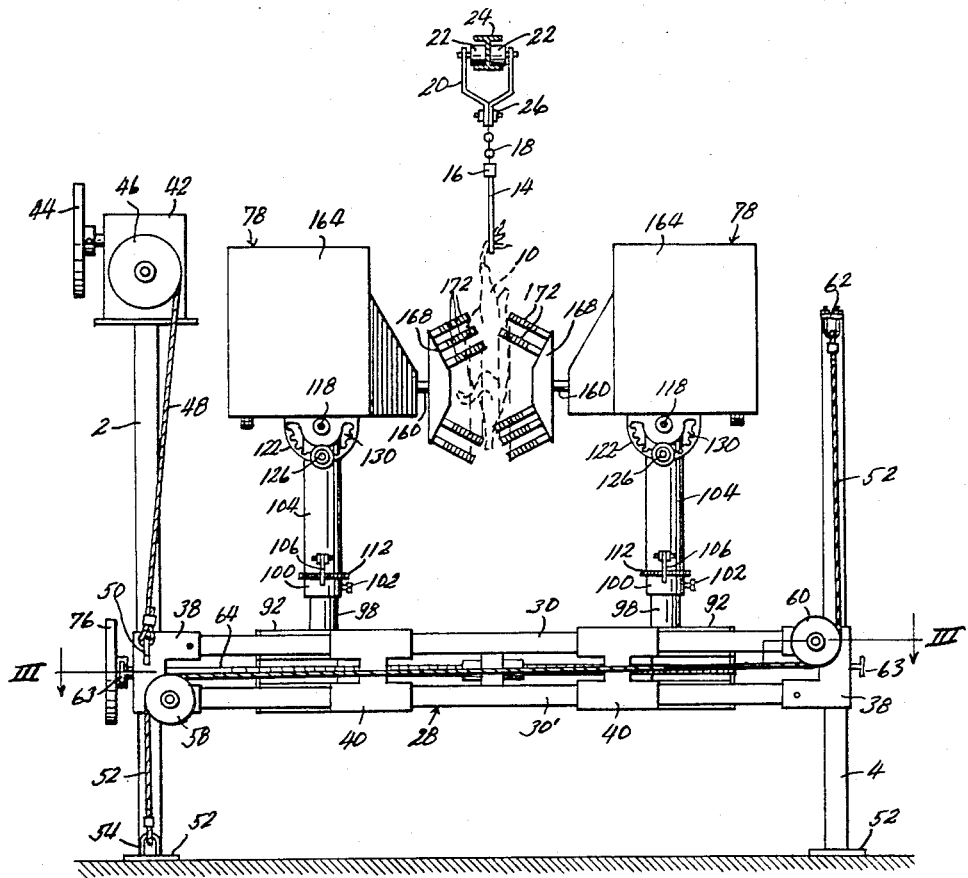
Figure 3:
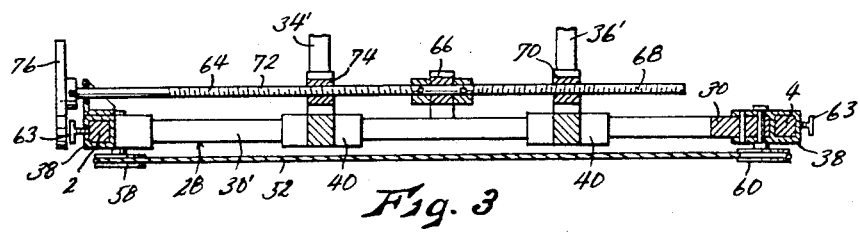

With these objects in view, as well as other objects which will appear in the course of the specification, reference will be had to the accompanying drawing, wherein:

FIG. 1 is a top plan view of a poultry defeathering apparatus embodying the present invention, FIG. 2 is a front elevational view of the apparatus as shown in FIG. 1, FIG. 3 is a fragmentary sectional view taken on line III—III of FIG. 2, FIG. 4 is an enlarged, fragmentary sectional view taken on line IV—IV of FIG. 1, including a face view of one of the picking heads, FIG. 5 is a fragmentary sectional view of one of the picking heads, taken on line V—V of FIG. 4, FIG. 6 is a fragmentary sectional view taken on line VI—VI of FIG. 4, FIG. 7 is a fragmentary sectional view taken on line VII—VII of FIG. 4, FIG. 8 is an enlarged, fragmentary sectional view taken on line VIII—VIII of FIG. 1, FIG. 9 is a fragmentary sectional view taken on line IX—IX of FIG. 8, FIG. 10 is an enlarged sectional view taken on line X—X of FIG. 9, FIG. 11 is a reduced, schematic view similar to FIG. 2, with parts omitted, showing the picking heads positioned to remove feathers from the tail, hocks and lower abdomen and back of the birds, FIG. 12 is a view similar to FIG. 11 but showing the picking heads positioned to remove feather from the neck, shoulders and wings of the birds, FIG. 13 is a reduced, fragmentary schematic view similar to FIG. 1 showing the picking heads angled oppositely to the direction of poultry travel to remove feathers more effectively from the leading sides of the birds, FIG. 14 is a view similar to FIG. 13 showing the picking heads angled forwardly to more effectively remove feathers from the trailing sides of the birds, and FIG. 15 is a view similar to FIG. 13 showing the picking heads at the opposite sides of the path of poultry travel staggered longitudinally of the path to produce a serpentine path and a twisting or "tumbling" action thereof.

Like reference numerals apply to similar parts throughout the several views. The apparatus or machine is supported by a main frame including a pair of generally vertical front corner posts 2 and 4 and a pair of generally vertical rear corner posts 6 and 8. Poultry, indicated at 10 in dotted lines in FIG. 2 is conveyed forwardly through the machine, in the direction of arrow 12 in FIG. 1, along a generally horizontal path midway between the corner posts at opposite sides of the machine. As shown in FIG. 2, each bird is suspended from a shackle 14 which is connected by means of a swivel connector 16 and a short flexible chain 18 to a bracket 20 having rollers 22 supporting it for movements along a conveyor track 24. The brackets 20 of the shackles are connected at intervals to a conveyor chain 26 which is driven by any suitable means, not shown, to move the shackles along the track at a generally uniform rate.

Corner posts 2, 4, 6 and 8 carry a generally horizontal platform forming a part of the main frame and designated generally by the numeral 28. Said platform includes a double cross bar 30–30' extending horizontally between front corner posts 2 and 4, and a double cross bar 32–32' extending horizontally between rear corner posts 6 and 8, and a pair of double longitudinal bars 34–34' and 36–36' extending horizontally and longitudinally of the machine between cross bars 30 and 32.

Each end of each cross bar 30 and 32 is affixed to a tubular bracket 38 which is vertically slidable on the associated corner post, and each end of each longitudinal bar 34 and 36 is affixed to a tubular bracket 40 which is slidable along the associated cross bar.

Platform 28 may be adjusted vertically on the corner posts by means of a pair of gear reduction units 42 mounted respectively at the upper ends of corner posts 2 and 6. Each of said reduction units is manually operable by a handwheel 44 to turn a drum 46 on which is wound a cable or chain 48, the free end of which is extended downwardly and engaged into hook 50 affixed to the platform bracket 38 of the associated post. Each corner post is also provided with a foot 52, and affixed to the foot of posts 2 and 6 is an eye 54 (see FIG. 2) in which is engaged one end of a cable or chain 52. The cable of each of corner posts 2 and 6 is extended upwardly and trained about a pulley 58 mounted for rotation about a longitudinal horizontal axis on the platform bracket 38 of the associated corner post. From pulleys 58, the cables 52 extend horizontally across the machine and are trained about pulleys 60 rotatably mounted on platform brackets 38 associated respectively with corner posts 6 and 8. From pulleys 60, cables 52 extend upwardly and each is attached at its upper end to a bracket 62 at the upper end of its associated corner post. Thus by turning handwheels 44, platform 28 may be raised, lowered, or tilted longitudinally of the machine, for purposes to be described. Tilting of the platform, as represented by vertical inclination of longitudinal bars 34 and 36, may result in tilting the corner posts 2, 4, 6 and 8, but this is of course permissible so long as the lower ends of said corner posts are not rigidly anchored. After the elevation of the platform has been adjusted as desired, brackets 38 may be secured in position on the corner posts by means of set screws 63.

The distance between longitudinal bars 34 and 36 may be adjusted, for purposes to be described, by means of a pair of adjusting screws 64 disposed respectively adjacent cross bars 30 and 32 and extending parallel thereto. Each of said screws (see FIG. 3) is rotatably mounted in a bearing block 66 fixed to the midpoint of the associated cross bar 30 or 32, has a threaded portion 68 threaded in a nut 70 affixed to the adjacent bracket 40 of longitudinal bar 36, an oppositely threaded portion 72 threaded in a nut 74 affixed to the adjacent bracket 40 of longitudinal bar 34, and is rotatable manually by means of a handwheel 76 affixed to one end thereof. By turning handwheels 76 equally, bars 34 and 36 may be moved closer together or farther apart, but will remain equally spaced at opposite sides of the vertical plane of poultry travel, as indicated by arrow 12 in FIG. 1. By turning handwheels 76 unequally, longitudinal bars 34 and 36 may be angled relative to each other in a horizontal plane. Brackets 40 may engage cross bars 30 and 32 with sufficient looseness to permit a limited degree of this horizontal angularity.

Carried by each of longitudinal bars 34 and 36, in longitudinally spaced relation therealong, are a series of picking elements each designated generally by the numeral 78. As best shown in FIGS. 4, 6 and 7, each element includes a mounting bracket 80 having a pair of downwardly opening channels 82 fitting respectively over the elements 34-34' or 36-36' of the associated longitudinal bar. Said channels are rigidly connected by the base portion 84 of a U-shaped connector 86, the legs 88 of said connector extending horizontally outwardly. The bracket is slidable along bars 34 and 36, and is fixable thereon by set screw 90 (see FIG. 7). Slidable on legs 88 of bracket 86 is a carrier base 92 having a pair of sockets 94 engaged over legs 88 (FIG. 6) and fixable thereon by set screws 96 (FIG. 7). Fixed to base 92 and extending upwardly therefrom is a circular post 98. Mounted on said post is a circular collar 100, said collar being rotatable and vertically slidable on said post, and being fixable thereon by set screw 102. Telescoped over the upper end portion of the post 98, and extending thereabove, is a tubular post extension 104, said extension being rotatable and vertically slidable on said post, and being adapted to rest at its lower end on collar 100. A latch bar 106 pivoted at its upper end, as at 108, to post extension 104, is adapted to be engaged selectively in any of a series of angularly spaced notches 110 (FIG. 7) formed in a flange 112 of collar 100, whereby to secure post extension 104 at any desired position of angular adjustment. The post extension may then be further secured on the post by set screws 114 (FIG. 4).

A tubular bearing sleeve 116 having a horizontal transverse axis is welded to the upper end of post extension 104, and carries a pivot pin 118. A motor carrier platform 120 is disposed above pivot pin 118, and has side flanges 122 depending respectively at opposite sides of post extension 104 and pivoted on pin 118, whereby platform 120 may be tilted about said pin as an axis. Said flanges extend below pin 118, and move in wiping engagement with brackets 124 welded respectively to opposite sides of post extension 104. A clamp pin 126 extends diametrically of said post extension passing through slots 128 formed therefor in the post extension and brackets 124, and through slots 130 of flanges 122 which are concentric with pivot pin 118. Referring particularly to FIGS. 9 and 10, it will be seen that pin 126 carries on one end thereof a clamp washer 132 engaging the outer face of one of flanges 122 and secured on said pin by collar 134, and on the other end thereof a clamp washer 136 engaging the outer face of the other of flanges 122, both of said washers being slidable on said pin. At the end of said pin opposite collar 134, a lever 138 is pivoted to said pin on a transverse axis at 140, said lever having a cam surface 142 abutting the outer surface of washer 136. When said lever is pivoted in one direction, cam 142 draws washers 132 and 136 tightly against flanges 122 to secure platform 120 against pivoting on pin 118, and releases the pressure on said washers to permit pivoting of the platform when said lever is pivoted in the opposite direction.

Fixed to platform 120 and extending upwardly therefrom is a post having a lower section 144 welded to said platform and an upper section 146 telescoped slidably over said lower section and fixable thereon by set screw 148 (FIG. 9). Mounted on the upper end of post section 146 is an electric motor 150 on the driveshaft 152 of which is mounted a pulley 154. Pulley 154 is operably connected by belt 156 with a pulley 158 fixed on a shaft 160. Said shaft extends above and parallel to platform 120, being journalled in bearings 162 mounted on said platform, is disposed at right angles to the pivot pin 118 of said platform, and has its free end projecting toward the vertical plane of poultry travel. The motor, belt, and platform 120 are covered, for safety, by a sheet metal hood 164 secured to said platform by bolts 166 (FIG. 9).

A picking head 168 is mounted on the end of shaft 160 extended toward the vertical plane of poultry travel, by means of set screw 170 (see FIG. 5). Said head is circular and concentric with shaft 160, and the outer surface thereof, being that surface toward the vertical plane of poultry travel, is convex in one form or another. As shown, said surface is frusto-conical concentrically with the shaft, the smaller diameter thereof being disposed outwardly of its larger diameter. Fixed in this surface are the base ends of a large number of picking fingers 172. Said fingers are flexible, being formed of rubber or other suitable material, and extend, when at rest, normally from the conical head surface, so as to be inclined forwardly and radially outwardly from shaft 160. They may all be of the same length, and as best shown in FIG. 4, are evenly distributed over the entire conical surface of head 168. They may be of different cross-sectional contours, rectangular fingers being shown, and are preferably circumferentially ribbed as best shown in FIG. 5.

In operation, motors 50 are set in motion to rotate picking heads 168, usually but not necessarily all in the same direction with respect to the carcasses of the birds, and conveyor chain 26 is set in motion to move the carcasses 10 in a generally horizontal path between the opposed banks of picking heads, along the line indicated by arrow 12 in FIG. 1, whereby the feathers are engaged and removed from said carcasses by picking fingers 172. Since the fingers are resiliently flexible, centrifugal force resulting from rotation of each head causes the fingers to flex radially outwardly from the axis of said head. The carcasses are therefore engaged not merely by the tips of the fingers, but by the ribbed longitudinal surfaces thereof. Moreover, the fingers engage the carcass surface with a sidewise "wiping" motion transverse to the longitudinal extent of the fingers themselves. This has been found to produce a very effective picking action, as compared to the more common "drum picker" in which fingers are mounted on and project from the surface of a generally cylindrical drum and the carcasses are moved parallel to the drum axis in engagement with the fingers, for at least two reasons. First, in the drum picker each finger tends to be drawn over the bird lengthwise of itself, and so tends to remove feathers in only a very narrow strip, while in the disc picker the lateral motion of each finger enables it to cover and remove feathers from a comparatively much greater area of the carcass. Second, in a drum picker the fingers in general impinge against the bird normally to the surface thereof, with the result that they often "rebound" away from the bird so rapidly that their picking efficiency is impaired. Also, the "beating" administered to the birds by fingers with this type of motion often breaks wings, loosens skin, and otherwise damages the birds. For this reason, it is quite customary to impose a top limit on the linear speed of the fingers to avoid undue damage. In the disc picker, on the other hand, the fingers generally approach the birds at much more acute angles to the surfaces of the carcasses, whereby to avoid excessive "beating" so as to permit higher finger speed and more efficient picking with less damage to the birds. Moreover, the acute angle of approach, plus the fact that the fingers are momentarily slowed by contact with the birds so as to tend to recover partially from the flexure thereof caused by centrifugal force, greatly reduces the bounce or "rebound" of the fingers away from the carcasses, so that they tend to remain against and "follow" the contour of the bird to provide effective picking action over a much wider area.

There are several advantages which flow from the use of the "convex" picking head as shown, as compared to disc pickers using flat or planar picking heads. Firstly, while in any disc picker the fingers must be flexed outwardly by centrifugal force, in order that the longitudinal picking edges thereof will be exposed to form a "picking surface" against which birds can impinge as described above, they must not bend outwardly too far or they will tend to lie flat against the head and lose their ability to "yield" against the birds. In flat disc pickers, this limitation has generally required a rather hard, stiff finger which not only increases the possibilities of loosening, bruising or scuffing of the skin, breakage of wings, or other damage to the birds, but also results in common breakage of the fingers themselves due to their stiffness and lack of yieldability, thereby creating a tedious and expensive maintenance problem. These problems are particularly evident when the picking heads are rotated fast enough to impart to the fingers an optimum liner speed for the best picking action. With the convex head, on the other hand, the fingers even when at rest are inclined radially outwardly, and due to this radial component they are subjected to less centrifugal bending stress than a finger normally parallel to the rotational axis would be. Therefore a softer, more resilient finger can be used and will still be flexed outwardly only to the same degree by the same optimum rotational speed, as would a harder, stiffer finger which was normally parallel to the rotational axis. Thus with the conical head, a softer, limper finger can be used, with not only the advantages of less bird damage and less finger breakage as described above, but also more efficient picking, since a more flexible finger can better follow the contour of the bird. The advantages just discussed actually flow more from the normal radial incline of the fingers than it does from the conical or convex contour of the head, and could be provided even in a flat or planar head by mounting the fingers in the head to project at acute angles therefrom. The latter concept is considered to fall within the scope of the present invention. However, the desired inclination of the fingers results easily and naturally from the use of the convex head, and the convex head also has other advantages to be discussed below. It should be emphasized that no limitation to the specific frusto-conical head contour actually shown is intended, and that this is the reason for the use of the more general term "convex." The term is intended to include any head surface which generally is convex toward the vertical picking plane, such as cones of any degree, spherical surfaces, hyperboloid on paraboloid surfaces, or even irregular curvatures.

A second advantage of the inclination of the fingers as provided by the convex head, relates to those fingers closest to the axis of rotation. These fingers have a relatively low speed as compared to those fingers farther from the axis, and are hence subjected to relatively small centrifugal force and flex only slightly. As a result, when these central fingers are normally parallel to the axis, as in flat disc pickers, they often do not flex sufficiently to allow their longitudinal operative edges to engage the birds at all, certainly not with the full lateral wiping action desired, and these central fingers are therefore often substantially ineffective and useless. With the fingers normally inclined as shown, on the other hand, these central fingers are already partially inclined in the direction of centrifugal flexure, and will be flexed still further to a position exposing their longitudinal edges for use, even with the relatively small centrifugal force available. Said central fingers are thereby rendered fully effective.

A third advantage of the convex heads is that they provide a greater spacing between the peripheral fingers of each pair of heads disposed in opposed relation at opposite sides of the path of poultry travel. This provides a wider tapered "mouth" for the entry of carcasses between said opposed heads, so that they enter therebetween freely and with less tendency to swing on their shackles to ride over the heads rather than between them. In fact, this wider entry "mouth," plus the tendency of the fingers to recover from their centrifugal flexure and move toward the rotational axis as they are momentarily slowed by contact with the carcasses tends to create a force or "suction" acting to "pull" the birds into the space between the opposed heads.

A fourth advantage of the convex heads is that due to the inclination of the fingers, their outer or free ends have larger orbits than they would if they were normally parallel to the rotational axes, and hence when centrifugally deflected their longitudinal edges define a larger picking area or surface, without at the same time requiring a larger head or more fingers. Actually, the advantages of the convex picking head, nicknamed the "flying saucer," are extremely difficult to analyze, pinpoint and define, although those discussed represent honest effort by many persons involved directly therewith. It has been thoroughly tested under many different conditions for use in commercial processing plants, and its overall superior efficiency, as compared to flat disc pickers, is glaringly obvious to those conducting the tests. The only difficulty has been, as suggested above, in analyzing the precise reasons for its superior operation.

A second general advantage of the structure shown, apart from the structure and configuration of the picking heads and fingers themselves, lies in the virtually limitless flexibility in the disposition of the picking heads relative to the poultry carcasses. Handwheels 44 permit complete vertical adjustment of the heads relative to the birds, so that the picking action may be concentrated at any desired elevation of the bird. By turning handwheels 44 unequally, the banks of picking heads may be tilted vertically so that as the birds move horizontally, successive opposed pairs of heads will gradually traverse the birds from top to bottom, or vice versa, as may be desired. Turning of handwheels 76 moves the opposed banks of heads closer together or farther apart, as may be dictated by the size of the poultry being defeathered. Actually, opposed heads would most commonly be disposed considerably closer together than shown, their fingers perhaps even interdigitating or overlapping at least when at rest, although they have been separated in the drawing for clarity and to avoid confusion. By turning handwheels 76 unequally, the opposed banks may be relatively angled in a horizontal plane, as for example to provide that successive opposed heads between which each bird passes will be disposed progressively closer together. This may be desirable to provide the progressively greater picking pressure of the fingers against the bird which may be required to remove the final, more tightly connected feathers. These, of course, are general adjustments each involving simultaneous movement of all of the picking heads.

Perhaps even more important are the means providing for adjustment of each picking element 78 individually, to vary its position relative to the birds independently of the position of other elements. Each element can be adjusted longitudinally of the poultry path by loosening its set screws 90 and moving its bracket 80 along longitudinal bar 34 or 36, can be adjusted toward or from the vertical path of poultry travel by loosening set screw 96 and sliding base 92 on legs 88, can be adjusted vertically by loosening set screws 114 and sliding post extension 104 on post 98, can be pivotally adjusted about a vertical axis by rotating post extension 104 on post 98, and pivotally adjusted about a horizontal axis by loosening clamp pin 126.

The latter two adjustments permit universal adjustment of the angularity of shafts 160 relative to the vertical plane of poultry travel, although the extended axes of said shafts will always intersect said plane. This adjustment is very important in adapting the machine to remove feathers most effectively from any selected portions of the birds. For example, while the position of the shafts at right angles to the plane of poultry travel, as illustrated in FIGS. 1 and 2 of the drawing, might be highly effective in removing feathers from the thickest portion of the torso, the shafts of opposed heads could be angled downwardly toward the bird, thereby bringing the upper fingers of said heads closer together to more effectively remove feathers from the narrower upper portions of the bird, such as the hocks and tail. This disposition of the heads is illustrated in FIG. 11. It will be seen that in all of FIGS. 11–15, the "picking surface" defined by the exposed longitudinal edges of picking fingers 172 when they are flexed outwardly, is indicated by curved lines 174, the fingers themselves not being shown in order to avoid confusion of lines. They could also be angled upwardly toward the bird to bring the lower fingers closer together to remove feathers more effectively from the narrower lower portions of the bird, such as the wings, shoulders and neck. This disposition of the heads is illustrated in FIG. 12. Also, the shafts could be angled either forwardly or rearwardly relative to the direction of travel of the birds, as shown respectively in FIGS. 14 and 13, whereby to remove feathers more effectively from either the leading or trailing sides of the birds. These adjustments of angularity of shafts 160 may of course require variations in the longitudinal spacing, vertical elevation, and transverse spacing of picking heads at one side of the path, as well as opposed heads at opposite sides of the path, but these can be accomplished readily by means of the longitudinal, transverse and vertical adjusting means already described. In order not to interfere with the individual adjustability of each picking head, each picking element is provided with its own individual driving motor 150, and it will be understood that electric power is supplied to each of said motors by means of a slack, flexible cable.

FIG. 15 shows another interesting possibility in the disposition of the heads, in which the heads at the opposite sides of the vertical plane of poultry travel are relatively staggered longitudinally of the path of travel, and are moved somewhat closer together so that the picking surface 174 of each head projects somewhat between the picking surfaces of the two adjacent heads at the opposite side of the path of travel. This forces the birds to follow a more or less sinuous or serpentine path through the machine, causing them to swing on shackle chains 18 and to twist about shackle swivels 16, producing a sort of "tumbling" action which under some circumstances is highly desirable since it exposes all portions of the birds to the picking action of the fingers in a more or less random pattern.

As a general note, it will be seen that if the fingers of any two heads, either opposed heads or adjacent heads, are moving in the same direction as they rotate, they may be allowed to interdigitate or intermingle. This may be desirable to apply greater picking pressure to the birds, but requires that opposed heads rotate in the same direction, or that adjacent heads at the same side of the path rotate in opposite directions, in order to avoid self-inflicted damage to the fingers. For this reason, and also to further enhance the flexibility of the machine, the motors 150 may be of a type which is reversible simply by reversing the polarity of the electric current supplied thereto.

It should be borne in mind, however, that the positions of the heads shown in the drawing are merely a small number of the almost limitless number of combinations possible. The vertical angling of the heads shown in FIGS. 11 and 12 could, for example, be combined in any degree with the horizontal angling of the heads shown in FIG. 13 or 14, or with the staggered relationship of the heads shown in FIG. 15, as well as with the horizontal, vertical and longitudinal linear adjustments already discussed.

Also, the individual heads of the machine may be adjusted independently of each other. Thus successive pairs of picking heads of the machine as shown may be set to pick different portions of the birds, so that said birds are completely picked as they travel the length of the machine. This has been found efficient on low-speed conveyor systems, although each portion of the bird may then be subjected to the most concentrated and effective action of only one or two pairs of picking heads. On higher speed conveyors, where inefficient picking might result from exposure of each part of the carcasses to only one or two pairs of heads, a series of machines as shown may be placed in end-to-end relation along a conveyor, with all or most of the heads of each machine set to concentrate on one particular part of the carcasses. A series of three machines as shown has been found fully effective to pick efficiently all parts of the carcasses even on a high-speed conveyor. This pinpointed or "localized" picking of the birds further tends to reduce damage to the birds, in that once a given portion of a bird has been picked, it need not be subjected to further beating by the fingers. In all other machines within our knowledge, having heads only in spatially fixed relation, effective removal of feathers from certain hard-to-pick areas can be obtained only by further subjection of the bird to the same picking heads, and this results in needless and excessive finger action against parts of the bird already cleanly picked. As previously discussed, this can cause substantial damage to the birds.

Another advantage resulting from the individual and entirely self-contained character of each picking element 78 is ease and convenience of service and mainteance. By loosening set screws 90 of one element, that entire element may be lifted free of the machine by disengaging channels 82 of base bracket 80 free of longitudinal bars 34-34' or 36-36', so that that element may be repaired or serviced with no necessity of removing the entire machine from service. Also, by switching an element 78 to the other side of the path of poultry travel and reversing the direction of rotation thereof, the opposite longitudinal edges of its picking fingers can be brought into play. This substantially doubles the effective life span of the fingers, and hence provides a very valuable economy. Furthermore, any desired number of picking elements can be positioned at either side of the path, as may be desired. Longitudinal bars 34 and 36 of any desired length can be substituted, for accommodating the desired picking elements.

While a specific embodiment of the invention has been described and shown, it will be readily apparent that many minor changes of structure and operation could be made without departing from the spirit of the invention.

What we claim as new and desire to protect by Letters Patent is:

1. In a poultry defeathering apparatus, a pair of spaced apart, substantially parallel rows of separate, longitudinally spaced defeathering units, each unit comprising:
   an upright post;
   a tubular member extending upwardly from the post and mounted thereon for rotation about a vertical axis;
   releasable means interconnecting the post and the member for holding the latter in any one of a number of preselected rotative positions;
   a defeathering assembly for each member respectively, each assembly including a rotatable convex picking head having a plurality of flexible fingers, and a prime mover operably coupled with the head for rotating the latter;
   means mounting each assembly on its corresponding member for swinging movement about a horizontal axis traversing the axis of rotative movement of the member; and
   releasable means for each assembly respectively for holding the latter in any one of a number of selected positions about said axis of swinging movement.

2. The invention of claim 1 wherein each unit includes:
   slidable means mounting its post on the apparatus for independent movement of the unit along the longitudinal axis of the apparatus, and
   lock means for holding the slidable means in any one of a plurality of positions along said longitudinal axis.

3. The invention of claim 1 wherein each unit includes:
   means mounting its post on the apparatus;
   a lateral extension on the mounting means projecting in a generally horizontal plane approximately perpendicular to said vertical axis;
   sleeve means joined to said post and releasably coupled to said lateral extension for independent movement of the unit in a horizontal plane traversing the longitudinal axis of the apparatus; and
   restraining means for holding the sleeve means in any one of a plurality of positions in said horizontal plane.

References Cited

UNITED STATES PATENTS

| | | | |
|---|---|---|---|
| 1,857,832 | 5/1932 | Bailey. | |
| 2,991,497 | 7/1961 | McKinley et al. | 17—11.1 |
| 3,235,904 | 2/1966 | Brown et al. | 17—11.1 |
| 3,273,198 | 9/1966 | Tomlinson | 17—11.1 |
| 3,277,515 | 10/1966 | Engkier et al. | 17—11.1 |

LUCIE H. LAUDENSLAGER, Primary Examiner.